United States Patent
Cappeln et al.

(10) Patent No.: US 9,580,972 B2
(45) Date of Patent: Feb. 28, 2017

(54) UNBONDED FLEXIBLE ARMORED RISER PIPE

(71) Applicant: National Oilwell Varco Denmark I/S, Brondby (DK)

(72) Inventors: Christian Ditlev Cappeln, Soborg (DK); Christian Emil Skaaning, Praesto (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 0 days.

(21) Appl. No.: 14/764,675

(22) PCT Filed: Jan. 30, 2014

(86) PCT No.: PCT/DK2014/050019
§ 371 (c)(1),
(2) Date: Jul. 30, 2015

(87) PCT Pub. No.: WO2014/117780
PCT Pub. Date: Aug. 7, 2014

(65) Prior Publication Data
US 2015/0368982 A1   Dec. 24, 2015

(30) Foreign Application Priority Data

Feb. 1, 2013 (DK) ................................. 2013 70057

(51) Int. Cl.
*E21B 17/01* (2006.01)
*F16L 11/08* (2006.01)
(Continued)

(52) U.S. Cl.
CPC ........... *E21B 17/01* (2013.01); *B29C 47/0023* (2013.01); *B29C 47/021* (2013.01); *B29C 47/04* (2013.01);
(Continued)

(58) Field of Classification Search
CPC .... B29C 47/0023; B29C 47/021; B29C 47/04; B29K 2027/16; B29K 2027/18; B32B 15/043; B32B 15/08; B32B 1/08; B32B 2307/54; B32B 2307/744; B32B 2439/40; B32B 2597/00; B32B 27/20; B32B 27/304; B32B 27/32; B32B 27/03
See application file for complete search history.

(56) References Cited

U.S. PATENT DOCUMENTS 4,549,581 A * 10/1985 Unno .................... B29C 53/583
                                                    138/109
5,601,893 A   2/1997 Strassel
(Continued)

FOREIGN PATENT DOCUMENTS

EP   1 475 560 A1   11/2004
EP   2 513 542 A    10/2012
(Continued)

OTHER PUBLICATIONS

"Recommended Practice for Flexible Pipe" API Recommended Practice 17B, Second Edition, Jul. 1, 1998.
(Continued)

*Primary Examiner* — James G Sayre
(74) *Attorney, Agent, or Firm* — Pearne & Gordon LLP

(57) ABSTRACT

An unbonded flexible armored pipe for transportation of fluids. The pipe has a center axis and a length and includes a carcass and an innermost sealing sheath with an inner surface surrounding the carcass. The carcass includes at least one elongate armor element wound to surround the center axis with a winding angle to the center axis defining a winding direction and a supporting surface facing towards the inner surface of the innermost sealing sheath and with a supporting surface radius Sr. The supporting surface includes a primary surface area and a plurality of restraining regions in the form of orifices in and/or protuberances and/or
(Continued)

indentations from the primary surface area, wherein the restraining regions each have a length determined along the winding direction of the elongate armor element which is up to about Sr times Π.

23 Claims, 8 Drawing Sheets

(51) Int. Cl.
| | |
|---|---|
| B32B 15/08 | (2006.01) |
| B32B 27/30 | (2006.01) |
| B32B 27/32 | (2006.01) |
| B32B 27/34 | (2006.01) |
| B32B 1/08 | (2006.01) |
| B29C 47/00 | (2006.01) |
| B29C 47/02 | (2006.01) |
| B29C 47/04 | (2006.01) |
| B32B 15/18 | (2006.01) |
| B32B 3/26 | (2006.01) |
| B32B 3/30 | (2006.01) |
| B29K 27/00 | (2006.01) |
| B29K 27/18 | (2006.01) |

(52) U.S. Cl.
CPC ............ *B32B 1/08* (2013.01); *B32B 3/266* (2013.01); *B32B 3/30* (2013.01); *B32B 15/08* (2013.01); *B32B 15/18* (2013.01); *B32B 27/304* (2013.01); *B32B 27/32* (2013.01); *B32B 27/34* (2013.01); *F16L 11/082* (2013.01); *B29K 2027/16* (2013.01); *B29K 2027/18* (2013.01); *B32B 2597/00* (2013.01)

(56) References Cited

U.S. PATENT DOCUMENTS

| | | | |
|---|---|---|---|
| 5,730,188 A | 3/1998 | Kalman | |
| 5,813,439 A | 9/1998 | Herrero | |
| 6,085,799 A | 7/2000 | Kodaissi | |
| 6,110,550 A | 8/2000 | Jarrin | |
| 6,123,114 A | 9/2000 | Seguin | |
| 6,145,546 A | 11/2000 | Hardy | |
| 6,192,941 B1 | 2/2001 | Mallen-Herrero | |
| 6,283,161 B1 | 9/2001 | Feret | |
| 6,354,333 B1 | 3/2002 | Dupoiron | |
| 6,408,891 B1 | 6/2002 | Jung | |
| 6,454,897 B1 | 9/2002 | Morand | |
| 6,668,867 B2 * | 12/2003 | Espinasse | F16L 11/08 138/135 |
| 6,691,743 B2 | 2/2004 | Espinasse | |
| 6,739,355 B2 * | 5/2004 | Glejbøl | F16L 11/16 138/133 |
| 6,843,278 B2 | 1/2005 | Espinasse | |
| 6,904,939 B2 | 6/2005 | Jung | |
| 7,772,541 B2 | 8/2010 | Froggatt | |
| 7,781,724 B2 | 8/2010 | Childers | |
| 9,273,806 B2 * | 3/2016 | Graham | E21B 17/01 |
| 2014/0000748 A1 * | 1/2014 | Gudme | F16L 11/082 138/137 |
| 2014/0014218 A1 | 1/2014 | Gudme | |
| 2014/0124079 A1 * | 5/2014 | Andersen | F16L 59/153 138/137 |

FOREIGN PATENT DOCUMENTS

| | | |
|---|---|---|
| WO | 00/36324 A1 | 6/2000 |
| WO | 01/61232 A1 | 8/2001 |
| WO | 01/81809 A1 | 11/2001 |
| WO | 02/42674 A1 | 5/2002 |
| WO | 2008/077409 A1 | 7/2008 |
| WO | 2011/034584 A2 | 3/2011 |
| WO | 2011/050810 A1 | 5/2011 |
| WO | 2011/072688 A1 | 6/2011 |
| WO | 2011/141033 A1 | 11/2011 |
| WO | 2012/030937 A2 | 3/2012 |
| WO | 2012/097817 A1 | 7/2012 |
| WO | 2012/097823 A1 | 7/2012 |

OTHER PUBLICATIONS

"Specificaiton for Unbonded Flexible Pipe" ANSI/API Specification 17J, Third Edition, Jul. 2008.
Denmark Patent Application No. PA 2011 00037, "An Unbonded Flexible Pipe" filed Jan. 20, 2011, corresponds to US.
Denmark Patent Application No. PA 2011 00099, "A Flexible Armored Pipe" filed Feb. 14, 2011, corresponds to US.
Search Report issued in Danish Patent Application No. PA 2013 70057 dated Sep. 18, 2013.
Denmark Patent Application No. PA 2013 70733, "An Unbonded Flexible Pipe and Pipe System" filed Nov. 29, 2013, corresponds to US.

* cited by examiner

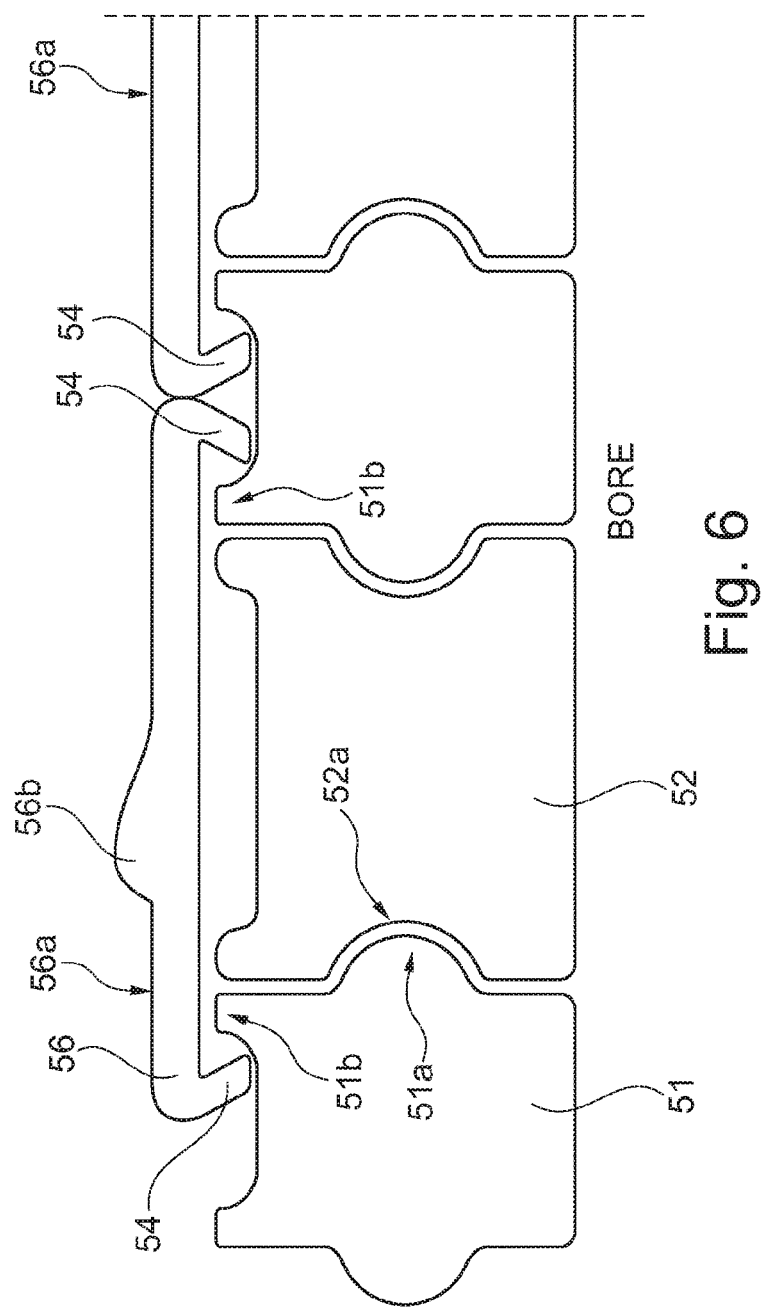

UNBONDED FLEXIBLE ARMORED RISER PIPE

TECHNICAL FIELD

The invention relates to an unbonded flexible armored pipe for use as a riser in offshore applications, in particular for transportation of hydrocarbon containing fluids such as $CO_2$, crude oil and/or gaseous fluids.

BACKGROUND ART

Flexible pipes of the present type for offshore transportation of fluids are well known in the art and are for example described in "Recommended Practice for Flexible Pipe", API 17 B, second Edition, 1998, which provides a standard for such pipes. Such pipes usually comprise an innermost sealing sheath also often called an inner sealing sheath, an inner sheath or an inner liner, which forms a barrier against the outflow of the fluid which is conveyed through the pipe, and one or more armor layers on the outer side of the inner sealing sheath (outer armor layer(s)). An outer sealing sheath may be provided with the object of forming a barrier against the ingress of fluids from the pipe surroundings to the armor layers. The innermost sealing sheath defines a bore of the unbonded flexible pipe in which a fluid can be transported.

Typical unbonded flexible pipes are e.g. disclosed in WO0161232A1, U.S. Pat. Nos. 6,123,114, 6,085,799 and in Recommended Practice for Flexible Pipe, API, 17B, Fourth edition, July 2008, and in Specification for Unbonded Flexible Pipe, API, 17J, third edition, July 2008.

The term "unbonded" means in this text that at least two of the layers including the armor layers and polymer layers are not bonded to each other. In practice the known pipe normally comprises at least two armor layers located outside the inner sealing sheath. These armor layers are not bonded to each other directly or indirectly via other layers along the pipe. Thereby the pipe becomes bendable and sufficiently flexible to roll up for transportation.

In order to have sufficient strength, in particular to prevent the collapse of the inner sealing sheath, the flexible pipe often comprises an armor layer located inside the space defined by the inner sealing sheath. Such inner armoring layer or layers are normally referred to as a carcass and are mainly provided in order to reduce the risk of collapse of the pipe when used under high hydrostatic pressure. An unbonded flexible pipe with a carcass is usually referred to as a rough bore pipe. The prior art carcasses are usually made from helically wound and interlocked metal strips, such as for example described in U.S. Pat. Nos. 6,904,939 and 6,145,546. However, also the use of profiled elongate elements in a carcass has been suggested in EP 1 475 560 and WO 2008/077409 by the assignee.

The innermost sealing sheath is normally extruded directly onto the carcass optionally with a thin tape e.g. fibrous tape between the layers. Since the material of the innermost sealing sheath at the extrusion stage is relatively soft and plastic it has a tendency to creep into helically shaped gaps provided by the helically wound and interlocked metal strips of the carcass. This creep into the helically shaped gaps can be very damaging to the innermost sealing sheath and often results in notch formation in the innermost sealing sheath which provides weakness to the innermost sealing sheath. In certain situations, in particular when the internal or external pressure is relatively high, such creep may result in a growing notch formation which results in reduced durability and even burst of the pipe. In order to avoid said creep prior art solutions have been provided, where a sacrificial layer or a rod has been applied between the carcass and the innermost sealing sheath in order to protect the innermost sealing sheath against damage. Such solutions are for example described in U.S. Pat. Nos. 6,843,278 and 6,145,546.

Another way of solving the problem of creep of the innermost sealing sheath is to provide the carcass with very reduced helically gap or gaps e.g. using shaped profiles instead of exclusively folded strips e.g. as disclosed in EP 1 475 560, DK PA2011 00037 and DK PA 2011 00099. By providing the carcass from profiles e.g. held together using strips, the surface of the carcass facing the innermost sealing sheath can be formed as a supporting surface with very small gaps between windings such that the innermost sealing sheath practically does not creep into such gaps. This solution has, however, found to have another drawback where the flexible pipe is intended for use as a riser. It has been found that in worst case the carcass can slip under its own weight resulting in increased gaps in the uppermost part of the flexible part and loss of flexibility in the lower part of the flexible pipe and ultimately such slip may result in total damage of the flexible.

DISCLOSURE OF INVENTION

An object of the present invention is to provide an unbonded flexible pipe suitable for use as an offshore riser pipe and comprising a carcass and an innermost sealing sheath, which unbonded flexible pipe is suitable for use at deep water and has a low risk of notch formation in the innermost sealing sheath.

A further object of the present invention is to provide an unbonded flexible pipe suitable for use as an offshore riser pipe and comprising a carcass and an innermost sealing sheath, and where the risk of slip between the carcass and the innermost sealing sheath is relatively low simultaneously with a low risk of notch formation in the innermost sealing sheath.

These and other objects have been solved by the invention as defined in the claims and as described herein below.

It has been found that the invention and embodiments thereof have a number of additional advantages which will be clear to the skilled person from the following description.

The term "substantially" should herein be taken to mean that ordinary product variances and tolerances are comprised.

The term "radial distance" is used herein to mean the distance to the axis of the pipe determined perpendicular to the axis when the pipe is substantially straight.

The term "in radial direction" means a direction from the axis of the pipe and radially outwards.

The terms "inside" and "outside" a layer of the pipe are used to designate the relative distance to the axis of the pipe, such that inside a layer means the area encircled by the layer, i.e. with a smaller radial distance than the layer, and "outside a layer" means the area not encircled by the layer and not contained by the layer, i.e. with a larger radial distance than the layer.

The term "inner side" of a layer is the side of the layer facing the axis of the pipe. The term "outer side" of a layer is the side of the layer facing away from the axis of the pipe.

The unbonded flexible pipe of the invention is preferably a riser pipe or constitutes a section of a riser pipe The term "riser" is herein used to designate a transportation line with a generally vertical orientation suitable for transportation of fluid e.g. from a subsea facility to an installation arranged above the subsea facility or visa verse.

The term "uppermost" and "lowermost" when used in connection with the pipe and parts thereof should be interpreted to mean in relation to the distance along the pipe where "uppermost" means with the longest distance along the pipe to the subsea facility and "lowermost" means with the shortest distance along the transportation line to the subsea facility It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

The term "seabed" is generally used to denote the subsea floor.

The term "above" means herein farther from the seabed. The term "below" means herein closer to the seabed.

The term "downwards" means in a direction towards the seabed.

All features of the invention including ranges and preferred ranges can be combined in various ways within the scope of the invention, unless there are specific reasons not to combine such features.

In the following description the term "elongate armor element" when used in singular should be interpreted to also include the plural meaning of the term unless it is specifically stated that it means a single elongate armor element.

The unbonded flexible armored pipe of the invention for transportation of fluids has a center axis and a length along its center axis. The center axis of the pipe defines the longitudinal direction of the pipe. The unbonded flexible pipe comprises a carcass and an innermost sealing sheath with an inner surface surrounding the carcass. The carcass and the innermost sealing sheath are not interfacially bonded to each other. The carcass comprises at least one elongate armor element wound to surround the center axis with a winding angle to the center axis defining a winding direction and a supporting surface facing towards the inner surface of the innermost sealing sheath. The supporting surface of the at least one elongate armor element has a supporting surface radius Sr which is determined as the radial distance from the supporting surface to the center axis of the pipe ignoring the restraining region. In other words, the Sr is determined as the radial distance from the primary surface area to the axis.

The supporting surface of the carcass formed by the elongate armor element(s) comprises a primary surface area and a plurality of restraining regions. Each of the restraining regions has a length determined along the winding direction of the elongate armor element which is up to about Sr timesΠ. By providing the restraining region with a length such that it extends up to about half round the pipe, it has been found that the restraining regions can be provided with a good grip towards the innermost sealing sheath while simultaneously providing a very low risk of notch formation. Where the restraining regions are even shorter in length determined along the winding direction of the elongate armor element, the risk of notch formation can be even further reduced as it will be explained further below.

The invention thereby provides a substantial and valuable contribution to the art which could not have been predicted by a skilled person.

To ensure high flexibility the unbonded flexible armored pipe advantageously comprises an armor layer of elongate armor elements helically wound around said innermost sealing sheath an in direct contact with the innermost sealing sheath or with an intermediate wound tape, wherein said elongate armor layer is not bonded or mechanically locked to said innermost sealing sheath.

As mentioned the innermost sealing sheath and the carcass are not bonded to each other, but the restraining regions provides an increased frictional resistance between the innermost sealing sheath and the carcass without locking the layers to each other. Advantageously the restraining region is shaped such as to allow relative movements between the innermost sealing sheath and the carcass, but with a higher frictional resistance between the layers than if the restraining regions were not there.

The term friction and frictional resistance is used interchangeable to mean the force that resists relative motion between the carcass and the innermost sealing sheath.

In a preferred embodiment the restraining regions are not mechanically locked to the sealing sheath allowing the sealing sheath against sliding relative to the carcass.

The friction includes in an embodiment both static and dynamic friction. In an embodiment the friction is mainly static friction It is generally preferred that the restraining regions do not prevent or lock the sealing sheath against movements relative to the carcass in circumferential direction since such tight locking may cause increased risk of notch formation.

The restraining regions are in the form of orifices in and/or protuberances and/or indentations from the primary surface area. In preferred embodiment the restraining regions are in the form of protuberances and/or indentations from the primary surface area. As indicated above it is desired that the restraining regions are shaped such that they do not lock the sealing sheath against movements relative to the carcass in circumferential direction. In an embodiment the restraining regions are shaped such that they do not lock the sealing sheath against movements relative to the carcass in both circumferential direction and in longitudinal direction (i.e. the direction of the center axis of the pipe). The restraining regions thereby increase the frictional resistance between the innermost sealing sheath and the carcass without fully locking these layers together in any direction.

The carcass can be in the form of one single wound elongate armor element or it can comprise a plurality of elongate armor elements.

In an embodiment the one or more wound elongate armor elements are helically wound. The helically winding angle relatively to the axis of the pipe is advantageously relatively high, such as about 75 degrees or higher, such as about 80 degrees or higher. The high winding degree ensures a high strength against collapse of the pipe.

In an embodiment the carcass is as described in "Recommended Practice for Flexible Pipe", ANSI/API 17 B, fourth Edition, July 2008, or in the standard "Specification for Unbonded Flexible Pipe", ANSI/API 17J, Third edition, July 2008, with the modification that the annular armoring members comprise each a supporting surface facing towards the innermost sealing sheath and with a supporting surface radius Sr, wherein the supporting surface comprises a primary surface area and a plurality of restraining regions in the form of protuberances and/or indentations from the primary surface area, wherein the restraining regions each have a length determined along the winding direction of the elongate armor element which is up to about Sr timesΠ.

In an embodiment the carcass is as described in WO 2012/097817 with the modification that the annular armoring members comprise each a supporting surface facing towards the innermost sealing sheath and with a supporting surface radius Sr, wherein the supporting surface comprises a primary surface area and a plurality of restraining regions in the form of protuberances and/or indentations from the primary surface area, wherein the restraining regions each have a length determined along the winding direction of the elongate armor element which is up to about Sr timesΠ. In this embodiment the carcass is the innermost layer of the pipe and comprises at least one profiled elongate element, helically wound to provide elongate element windings along the length of the pipe, the profile of the at least one elongate element is such that the elongate element windings engage with adjacent elongate element windings directly and/or indirectly, the elongate element(s) being helically wound with a winding angle to the center axis of at least about 80 degrees, thereby providing a quasi fluid permeable inner wall of the bore with discontinuities between successive turns of the wound elongate element(s), wherein the discontinuities have an average width in the axial direction of the pipe which is about 3 mm or less, preferably about 2 mm or less when the pipe is in an unloaded and unbent condition, and where the number of discontinuities is sufficient to allow the pipe to bend with a minimum bending radius of about 10 m or less, when the pipe is in an unloaded condition.

In an embodiment the carcass is as described in WO 2012/097823 with the modification that the annular armoring members comprise each a supporting surface facing towards the innermost sealing sheath and with a supporting surface radius Sr, wherein the supporting surface comprises a primary surface area and a plurality of restraining regions in the form of protuberances and/or indentations from the primary surface area, wherein the restraining regions each have a length determined along the winding direction of the elongate armor element which is up to about Sr timesΠ. In this embodiment the carcass is in the form of a displacement reduced armor layer comprising a plurality of elongate elements comprising at least a female type elongate element with a first cross-sectional profile and a male type elongate element with a second cross-sectional profile, each of the female type and the male type elongate elements are substantially symmetrical in a symmetry line substantially normal to the inner sealing sheath when the pipe is in a non-bent state, the elongate elements are helically wound to provide elongate element windings of alternately a female type elongate element winding and a male type elongate element winding along the length of the pipe, the female type elongate element windings have a first and a second opposite side facing adjacent male type elongate element windings and comprising each a recess, the male type elongate element windings have a first and a second opposite side facing adjacent female type elongate element windings and comprising each a protruding tongue, wherein the protruding tongues of the male type elongate element windings are laterally engaged in the recesses of adjacent female type elongate element windings.

In an embodiment the carcass comprises a plurality of elongate armor elements each wound to form an annular armoring member such as ring shaped annular armoring members. The carcass comprising or consisting of annular armoring members can for example be as described in WO 2011/050810 with the modification that the annular armoring members comprise each a supporting surface facing towards the innermost sealing sheath and with a supporting surface radius Sr, wherein the supporting surface comprises a primary surface area and a plurality of restraining regions in the form of protuberances and/or indentations from the primary surface area, wherein the respective restraining regions have a length determined along the winding direction of the elongate armor element which is up to about Sr times Π.

Advantageously the primary surface area of the supporting surface has a curvature corresponding to the curvature of the inner surface of the innermost sealing sheath faced by the primary surface area. Thereby any risk of slip between the carcass and the innermost sealing sheath is further reduced.

The carcass has a total supporting surface area which is the total supporting surface area of the one or more elongate armor elements of the carcass.

The inner surface of the innermost sealing sheath has an inner surface area. The relative size of the supporting surface area to the inner surface area for example determined for a length section of the pipe, such as about 5 meters, is advantageously relatively high while still below 100% in order to ensure a desired flexibility while simultaneously having a low risk of creep of the innermost sealing sheath into gaps between windings of the elongate armor element(s). In an embodiment the total supporting surface area is at least about 90% relative to the inner surface area, such as at least about 95% relative to the inner surface area, such as at least about 97% relative to the inner surface area, such as at least about 98% relative to the inner surface area, such as at least about 99% relative to the inner surface area. In an embodiment the total supporting surface area is from about 95% to about 98% relative to the inner surface area.

The carcass has a total primary surface area which is a fraction of the total supporting surface area, such as from about 3% to about 20% of the total supporting surface area. In an embodiment the total primary surface area is at least about 80% relative to the inner surface area, such as at least about 85% relative to the inner surface area, such as at least about 88% relative to the inner surface area, such as at least about 90% relative to the inner surface area, such as at least about 95% relative to the inner surface area.

The at least one elongate armor element is advantageously wound to provide a plurality of elongate element windings along the length of the pipe. To ensure that the respective windings are held in desired correlation to each other the plurality of elongate element windings are advantageously interlocked.

The term "interlocked" used about the elongate element windings means herein that the interlocked elongate element windings are interlocked with respect to each other to limit the displacement in the longitudinal direction of the pipe (along the direction of the center axis). The maximal displacement in the longitudinal direction of the pipe is in general referred to as the play between the elongate element windings.

In an embodiment the interlocked windings are at least radially engaged. In an embodiment the interlocked windings are both radially engaged and laterally engaged.

The term "laterally engaged" means an engagement of adjacent elongate element windings in a direction which is substantially perpendicular to the winding angle of the elongate elements relative to the axis of the pipe.

The term "radially engaged" means an engagement of adjacent windings of elongate elements in substantially radial direction. A radial engagement of adjacent windings of elongate elements restricts the movements of the adjacent windings of elongate elements such that the formation of gaps is limited to a selected size also called "play".

In an embodiment the carcass comprises a plurality of elongate element windings along the length of the pipe provided by the at least one elongate armor element wherein the plurality of elongate element windings are directly and/or indirectly interlocked with adjacent elongate element windings.

The term "directly interlocked" means that the adjacent elongate element windings engage directly with each other and the term "indirectly interlocked" means that the adjacent elongate element windings are held together by one or more other elements—e.g. one or more additional elongate element(s) and/or one or more elongate element section(s) such as one or more C-shaped clips referred to a locking element(s). Such other element(s) is referred to as locking element(s). In an embodiment the locking element(s) is elongate armor element(s) of the carcass which does not provide the supporting surface.

In an embodiment the carcass comprises a plurality of elongate element windings along the length of the pipe provided by the at least one elongate armor element wherein the plurality of elongate element windings are indirectly interlocked with adjacent elongate element windings by being interlocked using at least one locking element, such as at least one wound locking element.

In an embodiment, the carcass comprises a plurality of elongate element windings along the length of the pipe provided by the at least one elongate armor element wherein at least a part of the plurality of elongate element windings are indirectly interlocked with adjacent elongate element windings by being interlocked using at least one locking element, such as at least one wound locking element.

The elongate armor element(s) of the carcass can comprise one or more profiled elements, one or more folded elements or a combination of profiled and folded elements.

In an embodiment the at least one elongate armor element comprises a profiled element, preferably the at least one elongate armor element is in the form of at least two profiled elements, optionally partly or fully interlocked using at least one locking element, such as at least one wound and optionally folded locking element.

In an embodiment the at least one elongate armor element comprises a folded element, preferably elongate element windings of the at least one elongate armor element are partly or fully interlocked using at least one locking element, such as at least one profiled and wound locking element.

A folded elongate armor element is herein defined as a long and in principle endless unit with at least one fold and a width which in unfolded condition is at least 6 times its thickness, such as at least 10, such as at least 15, such as at least 25 times its thickness or even up to 100 or 500 times its thickness. A profiled elongate armor element is a long and in principle endless unit with a pre-shaped non-folded cross sectional profile. The profile may preferably have a width of less than 6 times its thickness. The term "endless" is used to indicate that the tapes and profiles are very long compared to their other dimension.

Examples of suitable profiled elongate armor elements are as the elongate armor elements described in any one of the publications U.S. Pat. Nos. 6,691,743, 6,668,867, 5,813,439, WO 0242674, U.S. Pat. Nos. 5,730,188, 6,354,333, 4,549,581, 6,192,941, 6,283,161, WO 0181809, WO 0036324, U.S. Pat. Nos. 6,454,897, 6,408,891, 6,739,355 and 6,110,550. Preferably the profiled elongate armor element(s) has/have a profile selected from the group consisting of Z-shaped profile, U-shaped profile, X-shaped profile, I-shaped profiles, H-shaped profile K-shaped profiles and T-shaped profile.

In an embodiment the carcass comprises at least one elongate folded armor element and at least one elongate profiled armor element and the at least one elongate folded armor element and the at least one elongate profiled armor element are helically wound and interlocked with each other. Preferably the elongate folded armor element(s) comprises the supporting surface facing towards the inner surface of the innermost sealing sheath and at least one elongate profiled armor element provides a locking element ensuring a radial engagement of the windings in the form of a directly or indirectly interlocking of the elongate armor element windings.

In an embodiment the carcass comprises at least one helically wound and elongate folded armor element having along its elongate length a mid-section and a first and a second edge section, which edge sections are folded towards each other such that each of the edge sections has an angle to the mid-section of less than 90 degrees, preferably from about 45 to about 85 degrees, such as from about 75 to about 80 degrees. By providing the folded armor element with folded edges of less than 90 degrees to its mid-section, an interlocking provided between elongate armor element windings involving the folded edge sections ensures a high flexibility of the unbonded flexible pipe while simultaneously allowing any gaps (play) between windings to be kept rather small. Further it has been found that this construction ensures to keep the play between windings almost constant along the length of the pipe even when used as a riser.

Advantageously the supporting surface is provided by a surface of the mid-section of the elongate folded armor element. In this embodiment the respective edge sections are folded away from the innermost sealing sheath.

The carcass comprises a plurality of elongate element windings along the length of the pipe provided by the at least one elongate armor element. Preferably the carcass comprises an average gap between the supporting surface of adjacent elongate element windings which is about 3 mm or less, such as about 2 mm or less when the pipe is in an unloaded and unbent condition. Thereby any risk of creep of the innermost sealing sheath into the gap is very low and the risk of notch formation has also been found to be low.

In an embodiment a thin fibrous layer, such as the cover tape layer described in co-pending patent application PA 2012 70733 DK, is applied between the innermost sealing sheath and the carcass.

Advantageously the supporting surface has a width which is close to the maximal width of the elongate armor element having the supporting surface. Thereby the gap between windings can be kept low.

The at least one elongate armor element has a height determined radial to the axis and a width determined perpendicular to its height and adjacent to the innermost sealing sheath and a maximal width determined perpendicular to its height and perpendicular to its winding direction. Advantageously the maximal width is identical to the width determined adjacent to the innermost sealing sheath.

The supporting surface has a width determined parallel to the width of the elongate armor element wherein the width of the supporting surface is at least about 90% of the maximal width of the elongate armor element, such as at least about 99% of the maximal width of the elongate armor element, such as substantially identical to the maximal width of the elongate armor element.

Preferably each of the plurality of restraining regions is surrounded by the primary surface area thereby ensuring a distance between a gap between windings and restraining regions. This construction has been found to further reduce any potential risk of notch formation in the innermost sealing sheath.

Although the restraining regions may include orifices it is generally preferred that such potential orifices advantageously should be relatively small since larger orifices may result in undesired creep of the innermost sealing sheath. Generally it is desired that such potential orifices should not have dimensions above about 3 mm.

In an embodiment the supporting surface is free of orifices larger than about 5 cm$^2$, such than about 2 cm$^2$, preferably the supporting surface is essentially free of orifices.

Preferably the plurality of restraining regions comprises protuberances and/or indentations from the primary surface area, more preferably the restraining regions do not include orifices.

To reduce the risk of notch formation further it is desired that any protuberances and indentations from the primary surface area has a rounded curvature, and preferably the curvature in any direction has a minimum radius not less than about 2 mm, preferably at least about 3 mm, preferably at least about ⅓ of the smallest of its width and length. In an embodiment any protuberances and indentations from the primary surface area has a smooth curvature.

In an embodiment any protuberances and indentations from the primary surface area has a Gaussian curvature.

In an embodiment any protuberances and indentations from the primary surface area has a substantially constant curvature.

In an embodiment the restraining regions are elongate regions arranged with length direction generally in the length direction of the elongate armor element(s)

In an embodiment the restraining regions each have a length determined along the winding direction of the elongate armor element which is up to about 2 Sr, such as up to about Sr, such as up to about ½ Sr. As mentioned above the restraining regions should not extend beyond half around the axis of the pipe. In principle the shorter the restraining regions, the lower the potential risk of notch formation, however, if the restraining regions become too short they may not provide a sufficient grip in the innermost sealing sheath. The optimal length and size of the restraining regions depend largely on the type of innermost sealing sheath, the size of the pipe and the weight of the carcass.

In an embodiment the restraining regions each have a length determined along the winding direction of the elongate armor element which is at least about 0.1 Sr, such as at least about 0.2 Sr, such as at least about 0.3 Sr.

In an embodiment the supporting surface has a width determined perpendicular to the elongate armor element and the restraining regions each have a width perpendicular to its length, wherein the width of the restraining regions is up to about 0.95 times the width of the supporting surface, such as up to about 0.9 times the width of the supporting surface, such as up to about 0.8 times the width of the supporting surface, such as up to about 0.6 times the width of the supporting surface, such as at least about 0.2 times the width of the supporting surface.

Preferably the restraining regions each have a width of from about 0.2 to about 0.95 times the width of the supporting surface, such as from about 0.3 to about 0.8 times the width of the supporting surface.

The restraining regions may be identical or they may differ from each other. Advantageously the restraining regions are substantially identical to each other.

In an embodiment the restraining regions each have a width determined perpendicular to its length of from about 2 mm to about 10 cm, such as from about 0.5 cm to about 5 cm perpendicular to its length.

The at least one elongate armor element has a front side facing towards the axis of the pipe and a rear side facing away from the axis of the pipe where the supporting surface is provided by the rear side of the elongate armor element. When the elongate armor element is unwound to be in straight position, advantageously the rear side of the at least one elongate armor element is substantially flat with exception to the restraining regions. Thereby substantially all of the rear side of the elongate armor element is part of or all of the supporting surface.

In an embodiment the restraining regions comprise a plurality of protuberances, optionally all the restraining regions are in the form of protuberances.

In an embodiment the restraining regions are in the form of protuberances placed with substantially equidistance along the length of the elongate armor element.

The height of the protuberances can be equal or they can differ. Advantageously the height of the protuberances should not be too low since this may result in a poor friction towards the inner surface of the innermost sealing sheath. On the other hand, it is desired that the height of the protuberances should not be too high since this may result in a weakening of the innermost sealing sheath or even in notch formation where the innermost sealing sheath is of a very notch sensitive material such as PVDF or other fluoride containing polymers. Preferably the protuberances have a protruding height of from 0.5 mm to about 25% of the thickness of the innermost sealing sheath. In an embodiment the protuberances have a protruding height of from 2 mm to about 20% of the thickness of the innermost sealing sheath.

The protruding height is determined as the maximal height from the primary surface area in radial direction of the pipe.

In an embodiment the respective protuberances have a protruding height of least about 0.5 mm, preferably at least about 1 mm, such as from about 2 mm to about 1.5 cm, such as from about 3 mm to about 1 cm.

In order to ensure a very low risk of notch formation in the innermost sealing sheath the protuberances advantageously have a rounded shape. In a preferred embodiment the protuberances have a round or oval base and taper upwards to their protruding height, preferably they taper upwards with a rounding at their respective protruding height.

In an embodiment the protuberances comprise lens-shaped and/or hemispherical and/or half-sickle shaped protuberances. The protuberances are in this embodiment rotational symmetrical which makes the design and the shaping of the protuberances relatively simple.

In an embodiment the protuberances each have an oblong shape, the oblong shape is advantageously oriented in a direction corresponding to elongate direction of the elongate armor element (i.e. the winding direction)

In an embodiment the protuberances comprise sinusoidal wave shaped protuberances, preferably with a single wave shape along the length (winding direction) of the supporting surface.

In an embodiment the restraining regions comprise a plurality of indentations, optionally all the restraining regions are in the form of indentations. When providing the restraining regions in the form of indentations any risk of notch formation in the innermost sealing sheath is further reduced while still keeping the risk of slip between the innermost sealing sheath and the carcass very low even where the unbonded flexible pipe is used as a riser.

In an embodiment the respective indentations have a depression depth determined as the maximal depth in radial direction from the primary surface area, which depression depth is at least about 0.5 mm, preferably at least about 1 mm, such as from about 2 mm to about 1.5 cm, such as from about 3 mm to about 1 cm. A too small depression depth may result in a poor friction towards the inner surface of the innermost sealing sheath. A very large depression depth can potentially reduce the flexibility of the unbonded flexible pipe to an undesired level in particular where the area of restraining region is simultaneously large.

Where the restraining regions are indentations in the form of cavities such cavities advantageously have an axial-width determined in the axial direction of the pipe which is at least 2.5 mm, especially at least about 3 mm in order to provide a sufficient friction or grip between the carcass and the innermost sealing sheath.

In an embodiment the restraining regions are in the form of indentations placed with substantial equidistance along the length of the elongate armor element.

The depth of the indentations can be equal or may differ.

In an embodiment the indentations are in the form of cavities having a rounded shape, preferably the indentations have a round or oval base and taper downwards to their depression depth.

In an embodiment the indentations comprise lens-shaped and/or hemispherical and/or half-sickle shaped indentations. The indentations are e.g. circularly symmetrical.

In an embodiment the indentations comprise sinusoidal wave shaped indentations, preferably with a single wave shape along the length (winding direction) of the supporting surface.

In an embodiment the restraining regions have a round or oval periphery providing the base of the restraining region. In an embodiment the restraining regions are placed along the length of the elongate armor element and have each a round or oval periphery surrounded by primary surface area. The restraining regions can for example comprise 20-80% indentations and 20 to 80% protuberances.

In an embodiment each of the restraining regions has a periphery and a restraining region area enclosed in the periphery and determined in plane with the primary surface area. The restraining region area for each restraining region is advantageously up to about 100 cm$^2$, preferably from about 1 cm$^2$ to about 25 cm$^2$, such as from about 2 cm$^2$ to about 12 cm$^2$, such as from about 4 cm$^2$ to about 8 cm$^2$.

Oblong restraining regions advantageously have each a restraining region area of from about 4 cm$^2$ to about 100 cm$^2$, e.g. the longer, the larger restraining region area. Restraining regions which have substantially round (circular) base, have preferably each a restraining region area of from about 1 cm$^2$ to about 6 cm$^2$.

In an embodiment the sum of the restraining region areas along the length of the pipe constitutes from about 2 to about 75%, such as from about 5 to about 50% of the supporting surface area in at least a length section of the pipe. The length section is for example determined as a length section of the pipe of at least about 1 m, preferably at least about 5 m of the unbonded flexible pipe.

In an embodiment the sum of the restraining region areas along the length of the pipe is larger in one length section of the pipe than in another length section of the pipe. In an embodiment the sum of the restraining region areas along the length of the pipe is larger in an uppermost length section relative to a lower section of the pipe when the pipe is applied as a riser.

Advantageously the supporting surface is substantially constituted by the restraining region areas and the primary surface area.

To provide an optimal frictional resistance between the carcass and the innermost sealing sheath while keeping risk of notch formation low the restraining regions are advantageously arranged along the length of the at least one elongate and wound armor element with a distance of at least about 1 cm, such as from about 5 cm to about 25 cm between respective restraining regions. The restraining regions are advantageously arranged as islands surrounded by primary surface area.

In a preferred embodiment the restraining regions are arranged as islands surrounded by primary surface area and along the length of the at least one elongate and wound armor such that restraining region(s) in one winding is offset with respect to restraining region(s) in an adjacent winding. Preferably the restraining region(s) in one winding is offset with respect to restraining region(s) in a number of subsequent windings, such as with respect to restraining region(s) in 3 or more subsequent windings.

The carcass can for example be fully made of metal, such as steel. Advantageously at least the at least one elongate armor element is a metal armor element. In an alternative embodiment the carcass is made from or comprises elongate armor element(s) of composite material such as described in co-pending DK patent application PA 2012 00259 with the modification that the annular armoring members comprise each a supporting surface facing towards the innermost sealing sheath and with a supporting surface radius Sr, wherein the supporting surface comprises a primary surface area and a plurality of restraining regions in the form of protuberances and/or indentations from the primary surface area, wherein the respective restraining regions have a length determined along the winding direction of the elongate armor element which is up to about Sr times Π.

In an embodiment the carcass comprises helically wound, folded and interlocked strips of steel.

In an embodiment the carcass comprises helically wound, profiled steel wires optionally interlocked with folded strips of steel.

In an embodiment the carcass comprises helically wound, profiled elements of fiber reinforced polymer.

The innermost sealing sheath can be of any suitable polymer or combination of polymers e.g. as described in "Recommended Practice for Flexible Pipe", ANSI/API 17 B, fourth Edition, July 2008, and the standard "Specification for Unbonded Flexible Pipe", ANSI/API 17J, Third edition, July 2008. In an embodiment, the innermost sealing sheath is in the form of an extruded layer comprising or consisting of polyvinylidene fluoride (PVDF) (copolymer or monopolymer), polyethylene (PS) (optionally crosslinked) and/or polyamide (PA 6, PA 11 or PA 12).

The invention is in particular advantageous where the innermost sealing sheath is in the form of an extruded layer comprising or consisting of a fluoride containing polymer such as fluorinated alkoxyethylene (PFA), polytetrafluoroethylene (PTFE), polyvinylidene fluoride (PVDF) or mixtures thereof.

The unbonded flexible pipe of the invention advantageously comprises one or more armor layers on the outer side of the inner sealing sheath e.g. a pressure armor layer and a pair of cross-wound tensile armor layers of metal and/or of composite material as it is well known in the art. Further the pipe may comprise an outermost protection layer which optionally is liquid impervious. To provide a monitoring of the integrity of the pipe, the pipe may advantageously comprise a sensor arrangement, preferably comprising an optical fiber system such as a 3D sensing optical fiber system comprising a multicore fiber e.g. as marketed by Luna Technology and/or as described in U.S. Pat. Nos. 7,781,724, 7,772,541, WO 11034584 or WO 12030937. It has been found that such 3D sensing system in practice can be applied in any kind of unbonded flexible pipes. The multicore fiber can be incorporated in any layer of the unbonded flexible pipe or it can be applied in the bore of the pipe.

All features of the invention including ranges and preferred ranges can be combined in various ways within the scope of the invention, unless there are specific reasons not to combine such features.

BRIEF DESCRIPTION OF DRAWINGS

The invention will be explained more fully below in connection with a preferred embodiment and with reference to the drawings in which:

FIG. 5b is a perspective view of the elongate armor element of FIG. 5a.

FIG. 6 is a cross-sectional view of a carcass of a wall section of an embodiment of an unbonded flexible pipe of the invention where only the carcass is seen and where the cross-sectional cut is taken to be perpendicular to the wound elongate armor elements.

FIG. 7b is a close-up view of the carcass shown in FIG. 7a.

The figures are schematic and may be simplified for clarity. Throughout, the same reference numerals are used for identical or corresponding parts.

Further scope of applicability of the present invention will become apparent from the detailed description of embodiments given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
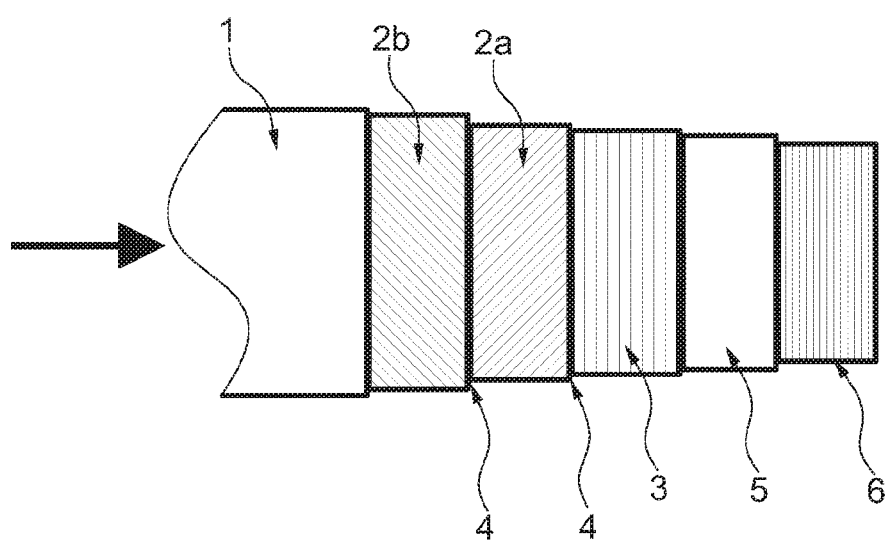
FIG. 1 is a schematic side view of an embodiment of an unbonded flexible pipe of the invention.

The unbonded flexible pipe shown in FIG. 1 comprises an innermost sealing sheath 5, often also called an inner liner, e.g. of high density poly ethylene (HDPE) cross linked polyethylene (PEX), Polyvinyldifluorid (PVDF) or polyamide (PA). The innermost sealing sheath 5 has the purpose of preventing outflow of the fluid transferred in the bore of the pipe, indicated with the arrow. Inside the innermost sealing sheath 5 the pipe comprises a carcass which has the main purpose of reinforcing the pipe against collapse as described above. The carcass 6 is not liquid tight. On the outer side of the innermost sealing sheath 5, the flexible pipe comprises a pressure armoring layer 3 which is often of helically wound armoring element(s) of metal or composite material (e.g. fiber reinforced polymer), which is wound with relative high angle to the axis of the pipe of such as of about 65 degrees or more e.g. about 85 degrees. The pressure armoring layer 3 is not liquid tight.

Outside the pressure armoring layer 3, the pipe comprises two cross wound tensile armoring layers 2a, 2b wound from elongate armoring elements e.g. of metal or composite material (e.g. fiber reinforced polymer). The elongate armoring elements on the innermost tensile armoring layer 2a are wound with a winding angle of about 55 degrees or less to the axis of the pipe in a first winding direction and the outermost tensile armoring layer 2b is wound with a winding angle of about 60 degrees or less, such as between about 20 and about 55 degrees to the axis of the pipe in a second winding direction which is the opposite direction to the first winding direction. The two armoring layers with such opposite winding direction are normally referred to as being cross wound. The pipe further comprises an outer sealing sheath 1 protecting the armoring layer mechanically and against ingress of sea water. As indicated with the reference number 4, the unbonded flexible pipe preferably comprises anti-friction layers between the armoring layers 3, 2a, 2b. The anti-friction layers are not liquid tight, and may for example be in the form of a wound film.

The innermost sealing sheath and the carcass are not bonded to each other. The carcass comprises at least one elongate armor element wound to surround the center axis with a winding angle to the center axis defining a winding direction and a supporting surface facing towards the inner surface of the innermost sealing sheath and with a supporting surface radius Sr, wherein the supporting surface comprises a primary surface area and a plurality of not shown restraining regions as described above.

Figure 2:
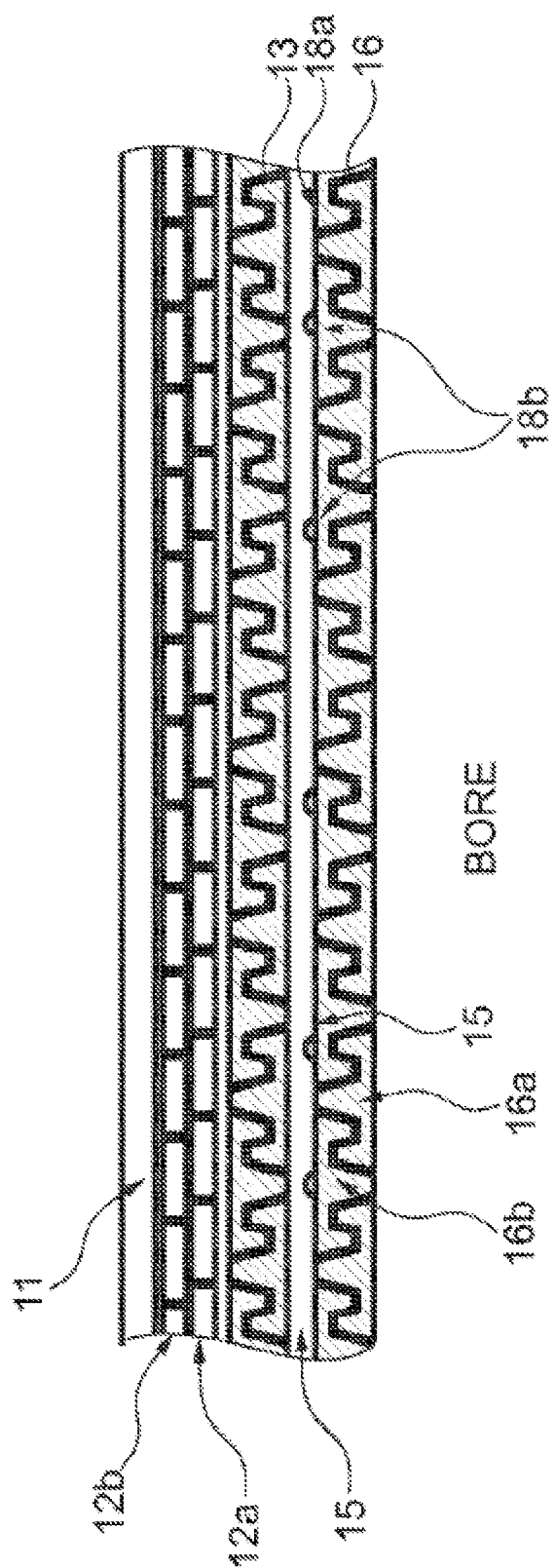
FIG. 2 is a cross-sectional view along the length of an embodiment of an unbonded flexible pipe of the invention where the layers of the pipe can be seen.

In FIG. 2 an example of an unbonded flexible pipe of the invention with layers as in FIG. 1 is shown.

The unbonded flexible pipe of the invention comprises from inside and outwards a carcass 16, an inner sealing sheath 15, a pressure armoring layer 13, two cross wound tensile armoring layers 12a, 12b and an outer sealing sheath 11.

The carcass 16 is made from profiled elongate elements 16a, 16b with a profile shaped as a T, where at least two T-shaped profiled elongate elements 16a, 16b are wound, such that they are turned in opposite direction to each other and are engaged in each other. The T-shaped profiled elongate elements 16a, 16b each have a supporting surface 18a facing towards the inner surface of the innermost sealing sheath 15. At least one of the T-shaped profiled elongate elements 16b has a plurality of restraining regions in the form of circular or oval protuberances 18b from the primary surface area. These protuberances ensure that the carcass armor elements are held in a desired position even where the unbonded flexible pipe is used as a riser.

In the shown embodiment the pressure armoring layer 13 is made from profiled elongate elements similar to the profiled elongate elements 16a, 16b of the carcass but without protuberances 18b. It should be understood that the pressure armoring layer 13 could be provided in any other way and from any other elongate elements for example such that it is known from prior art pressure armoring layers.

In the following examples only the carcass structure of the unbonded flexible pipe will be discussed. Other layers of the unbonded flexible pip, including sealing layers and armor layers on the outer side of the inner sealing sheath, may for example be as in the prior art, in Specification for Unbonded Flexible Pipe, API, 17J, Third edition, July 2008 and/or in Recommended Practice for Flexible Pipe, API, 17B, Fourth edition, July 2008. The pipe may additionally comprise further layers such as it is well known in the art e.g. insulation layer(s).

Figure 3:
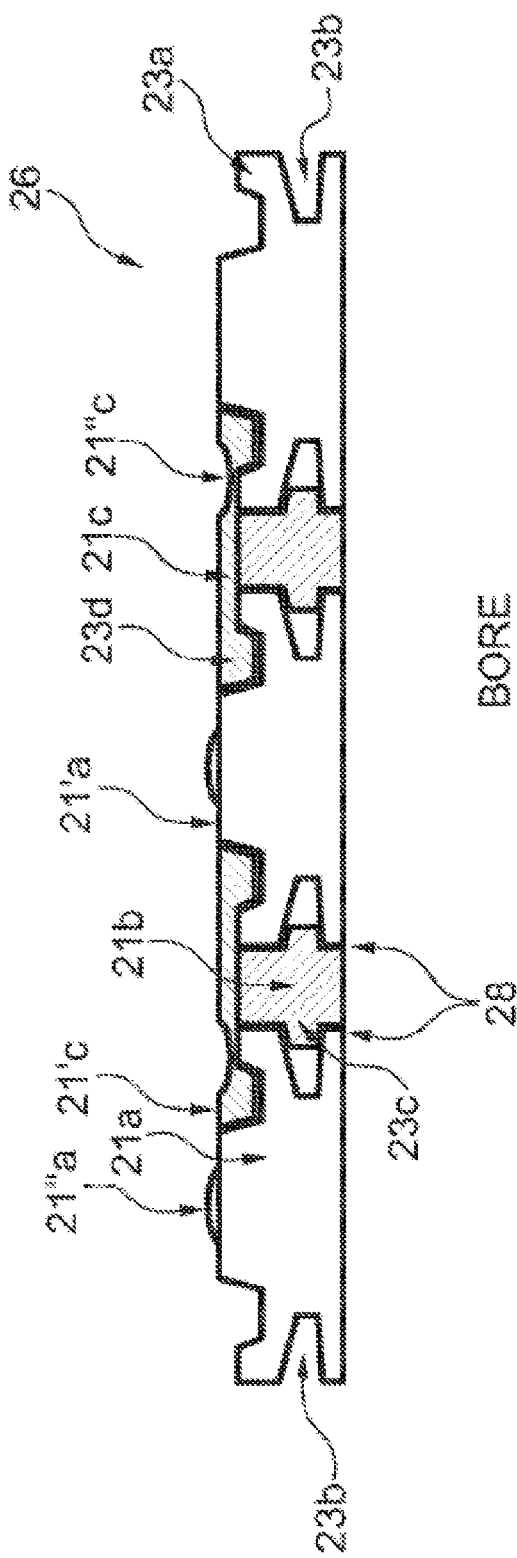
FIG. 3 is a cross-sectional view of a carcass of a wall section of an unbonded flexible pipe of the invention where only the carcass is seen and where the cross-sectional cut is taken to be perpendicular to the wound elongate armor elements.

FIG. 3 is an illustration of a carcass 26 provided from several types of profiled elongate armor elements 21a, 21b, 21c. The drawing illustrates a cross-sectional side view taken in cross-section of the profiled elongate armor elements 21a, 21b, 21c of the carcass 26.

The profiled elongate armor elements 21a, 21b, 21c are helically wound to provide elongate element windings along the length of the pipe. The carcass 26 has three types of profiled elongate armor elements 21a, 21b, 21c with different profile and optionally of different materials. The first profiled elongate element 21a, which is preferably of metal e.g. steel, is shaped with a K profile e.g. as described in U.S. Pat. No. 6,739,355 with the modification that it comprises a plurality of restraining regions 21"a. The first profiled elongate element 21a comprises recess' 23b and radial protruding parts 23a. The first profiled elongate element 21a comprises a supporting surface adapted to face towards the inner surface of a not shown innermost sealing sheath (the supporting surface is facing away from the bore). The supporting surface comprises a primary surface area 21'a and a plurality of restraining regions 21"a in the form of protuberances from the primary surface area 21'a. The respective restraining regions 21"a have a length determined along the winding direction of the elongate armor element 21a which is up to about Sr timesΠ where Sr is the radius of the supporting surface.

The second profiled elongate element 21b, which may be of metal or of polymer, is shaped with a + profile and comprises protruding parts 23c which are engaged with the recess' 23b of the first profiled elongate element 21a of adjacent elongate element windings. This engagement is in a direction substantially perpendicular to radial direction. The third profiled elongate element 21c, which may be of metal or of polymer, is shaped with a C profile e.g. as described in U.S. Pat. No. 6,739,355 with the modification that it comprises a plurality of restraining regions 21"c, The third profiled elongate element 21c comprises radial protruding parts 23d, which are engaged with the radial protruding parts 23a of the first profiled elongate element 21a of adjacent elongate element windings. This engagement is in a substantially radial direction. The third profiled elongate element 21c comprises a supporting surface adapted to face towards the inner surface of the not shown innermost sealing sheath (the supporting surface is facing away from the bore). The supporting surface comprises a primary surface area 21'c and a plurality of restraining regions 21"c in the form of indentations from the primary surface area 21'c. The respective restraining regions 21"c have a length determined along the winding direction of the elongate armor element 21c which is up to about Sr timesΠ where Sr is the radius of the supporting surface.

Figure 4:
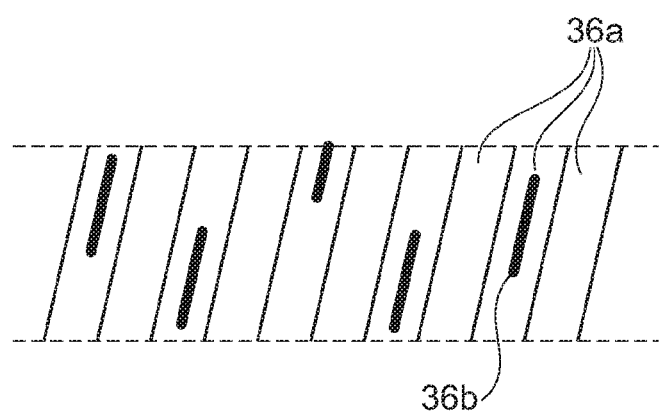
FIG. 4 is a schematic side view of a carcass prior to extrusion of the innermost sealing sheath onto the carcass.

FIG. 4 shows a carcass prior to extrusion of an innermost sealing sheath onto the carcass. Only the supporting surface 36 of the elongate element windings can be seen. The supporting surface 36 comprises a primary surface area 36a and a plurality of restraining regions 36b in the form of elongate indentations from the primary surface area 36a. The respective restraining regions 36b have a length determined along the winding direction of the elongate armor element which is about Sr where Sr is the radius of the supporting surface.

Figure 5A:
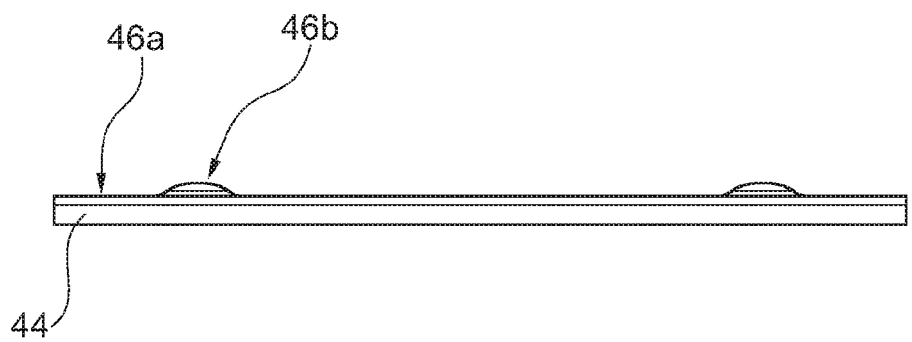
FIG. 5a is a side view of an elongate armor element for a carcass of an embodiment of a flexible unbonded pipe of the invention.
Figure 5B:
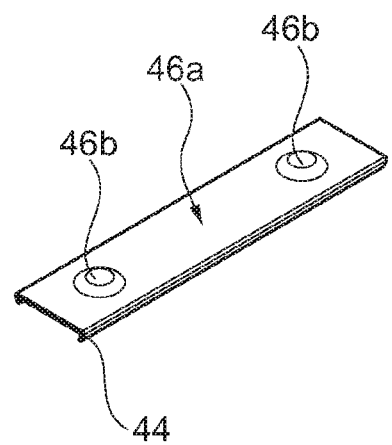
Figure 5C:
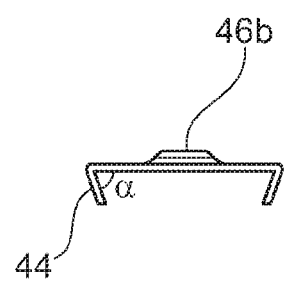
FIG. 5c is a cross-sectional view of the elongate armor element of FIG. 5a taken in the line A-A.

FIGS. 5a, 5b and 5c show a length section of an elongate armor element for a carcass of an embodiment of a flexible unbonded pipe of the invention. The elongate armor element is in the form of a folded strip of steel. The elongate armor element comprises a supporting surface adapted to face towards the inner surface of a not shown innermost sealing. The supporting surface comprises a primary surface area 46a and a plurality of restraining regions 46b in the form of half-sickle shaped protuberances 46b from the primary surface area 46a. The elongate armor element is folded to have two edges 44 with a folding angle α of below 90 degrees to the inner strip surface opposite the supporting surface, preferably α is from about 75 to about 88 degrees, e.g. about 80 degrees. The half-sickle shaped protuberances can be massive or hollow.

FIG. 6 is a cross-sectional view of a carcass of a wall section of an embodiment of an unbonded flexible pipe of the invention where only the carcass is seen and where the cross-sectional cut is taken to be perpendicular to the wound elongate armor elements.

The carcass shown in FIG. 6 comprises three types of elongate armor elements preferably of metal such as steel. A first profiled elongate armor element 51, a second profiled elongate armor element 52 and a third folded strip elongate armor element 56. The first profiled elongate armor element 51 comprises sideward protruding parts 51a which are laterally engaged with side recess' 52a of adjacent elongate element windings of the second profiled elongate armor element 52.

The first profiled elongate armor element 51 further comprises radially protruding parts 51b protruding in a direction away from the bore. The third folded strip elongate armor element 56 is folded to have two edges 54 which are radially engaged with protruding parts 51b of the first profiled elongate armor element 51. The third folded strip elongate armor element 56 comprises a supporting surface adapted to face towards the inner surface of a not shown innermost sealing and comprising a primary surface area 56a and a plurality of restraining regions 56b in the form of half-pear shaped protuberances 56b from the primary surface area 56a. The two edges 54 are folded with a folding angle α of below 90 degrees to the inner strip surface opposite the supporting surface, preferably a is from about 75 to about 88 degrees, e.g. about 80 degrees. Due to this folding the process of producing the carcass with evenly distributed play is simpler to control.

Figure 7A:
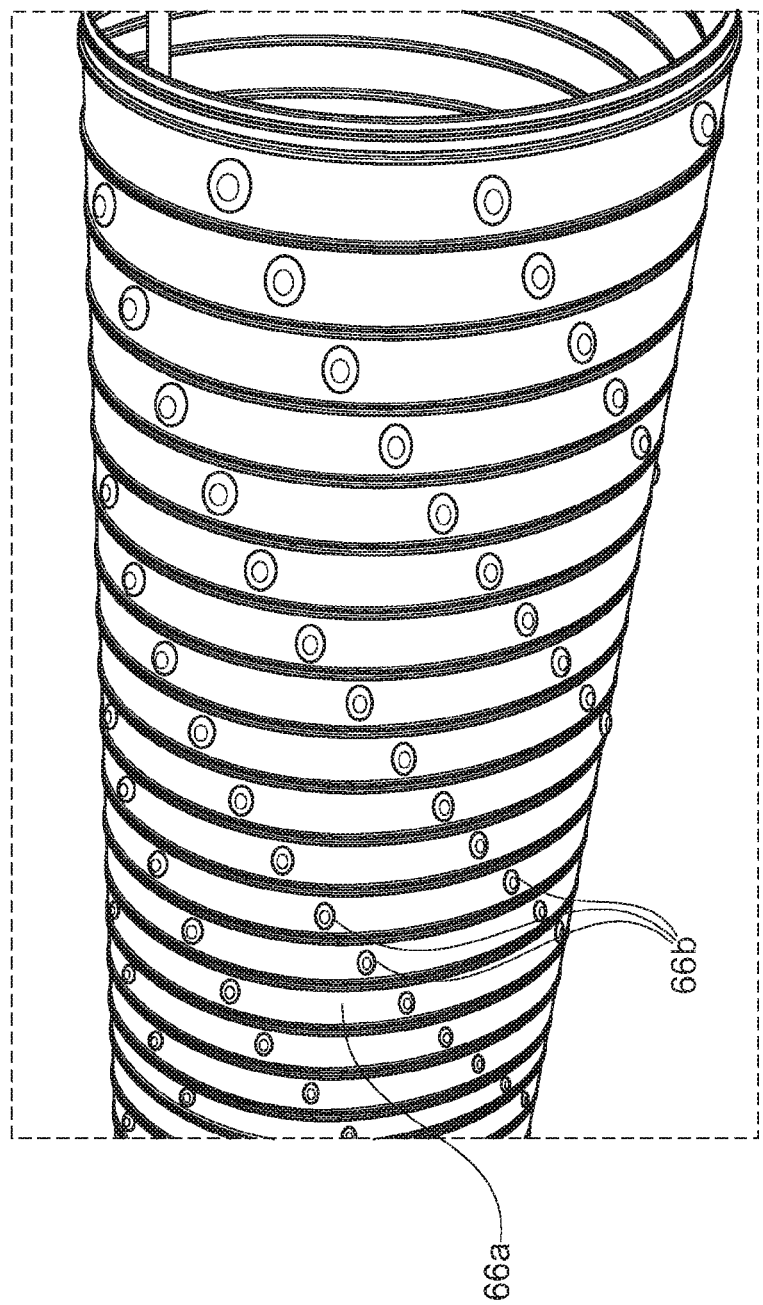
FIG. 7a is a perspective view of a carcass prior to extrusion of the innermost sealing sheath onto the carcass.
Figure 7B:
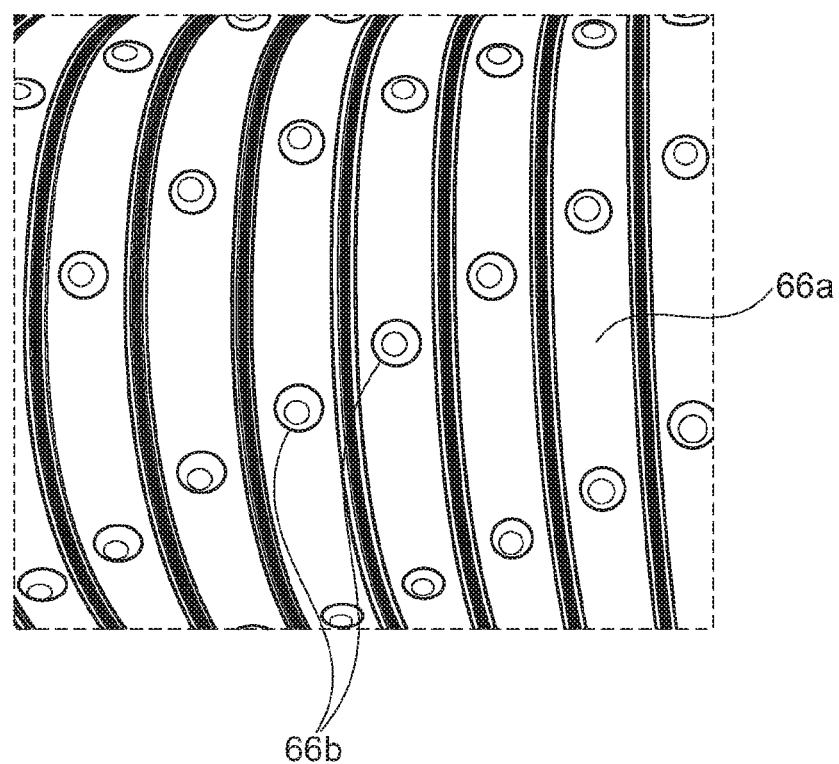

The carcass shown in FIG. 7a and FIG. 7b is shown in a perspective view prior to extrusion of the innermost sealing sheath onto the carcass.

FIG. 7b is a close-up view of the carcass shown in FIG. 7a. The carcass comprises a supporting surface adapted to face towards the inner surface of a not shown innermost sealing and comprising a primary surface area 66a and a plurality of restraining regions 66b. The restraining regions 66b are arranged along the length of at least one elongate and wound armor element, such that restraining region(s) in one winding is offset with respect to restraining region(s) in an adjacent winding.

What is claimed is:

1. An unbonded flexible armored pipe for transportation of fluids, having a center axis and a length, said unbonded flexible armored pipe comprising:
   a carcass; and
   an innermost sealing sheath with an inner surface surrounding said carcass, wherein:
   the carcass comprises:
      at least one elongate armor element wound to surround the center axis with a winding angle to the center axis defining a winding direction, and
      a supporting surface formed by the at least one elongate armor element, said supporting surface facing towards the inner surface of the innermost sealing sheath and having a supporting surface radius Sr, wherein the supporting surface of said carcass comprises a primary surface area and a plurality of restraining regions formed in said primary surface area, wherein the restraining regions each have a length determined along the winding direction of the elongate armor element which is less than a length of the elongate armor element.

2. The unbonded flexible armored pipe of claim 1, wherein the restraining regions each have a length determined along the winding direction of the elongate armor element which is up to about ½ Sr.

3. The unbonded flexible armored pipe as claimed in claim 1, wherein the primary surface area of the supporting surface has a curvature corresponding to a curvature of the inner surface of the innermost sealing sheath faced by the primary surface area.

4. The unbonded flexible armored pipe as claimed in claim 1, wherein the carcass has a total primary surface area, and the inner surface of the innermost sealing sheath has an inner surface area, the total primary surface area is at least about 80% relative to the inner surface area.

5. The unbonded flexible armored pipe as claimed in claim 1, wherein the carcass comprises a plurality of elongate element windings along the length of the pipe provided by the at least one elongate armor element wherein the carcass comprises an average gap between the supporting surface of adjacent elongate element windings which is about 3 mm or less.

6. The unbonded flexible armored pipe as claimed in claim 1, wherein each of the plurality of restraining regions is surrounded by the primary surface area, said each of the plurality of restraining regions comprising at least one of protuberances or indentations from said primary surface area.

7. The unbonded flexible armored pipe as claimed in claim 1, wherein the restraining regions each have a length determined along the winding direction of the elongate armor element which is at least about 0.1 Sr.

8. The unbonded flexible armored pipe as claimed in claim 1, wherein the supporting surface has a width determined perpendicular to the elongate armor element and the restraining regions each have a width perpendicular to its length, wherein the width of the restraining regions is up to about 0.95 times the width of the supporting surface.

9. The unbonded flexible armored pipe as claimed in claim 1, wherein the restraining regions each have a width from about 2 mm to about 10 cm perpendicular to its length.

10. The unbonded flexible armored pipe as claimed in claim 1, wherein the at least one elongate armor element has a front side facing towards the axis of the pipe and a rear side facing away from the axis of the pipe, wherein the rear side of the at least one elongate armor element, when the elongate armor element is unwound to be in straight position, is substantially flat when disregarding the restraining regions.

11. The unbonded flexible armored pipe as claimed in claim 1, wherein the restraining regions comprise a plurality of protuberances and wherein the respective protuberances have a protruding height determined as the maximal height from the primary surface area, which protruding height is at least about 0.5 mm.

12. The unbonded flexible armored pipe as claimed in claim 11, wherein the protruding height of the respective protuberances is from about 3 mm to about 1 cm.

13. The unbonded flexible armored pipe as claimed in claim 11, wherein the protuberances have a rounded shape and the protuberances have a round or oval base and taper upwards to their protruding height.

14. The unbonded flexible armored pipe as claimed in claim 13, wherein the protuberances comprise a shape selected from lens-shaped, hemispherical, or half-sickle shaped.

15. The unbonded flexible armored pipe as claimed in claim 1, wherein the restraining regions comprise a plurality of indentations, wherein the respective indentations have a depression depth determined as the maximal depth from the primary surface area, which depression depth is at least about 0.5 mm.

16. The unbonded flexible armored pipe as claimed in claim 1, wherein the restraining regions have a round or oval periphery surrounded by primary surface area.

17. The unbonded flexible armored pipe as claimed in claim 1, wherein the restraining regions are arranged along the length of the at least one elongate and wound armor element with a distance of from about 5 cm to about 25 cm.

18. The unbonded flexible armored pipe as claimed in claim 1, wherein the restraining regions are arranged along the length of the at least one elongate and wound armor such that restraining region(s) in one winding is offset with respect to restraining region(s) in an adjacent winding.

19. The unbonded flexible armored pipe as claimed in claim 1, wherein the carcass is made from metal and comprising helically wound, folded and interlocked strips of steel and/or helically wound, profiled steel wires.

20. The unbonded flexible armored pipe as claimed in claim 1, wherein the innermost sealing sheath is in the form of an extruded layer comprising a fluoride containing polymer.

21. The unbonded flexible armored pipe of claim 1, wherein the restraining regions are in the form of orifices in said primary surface area.

22. The unbonded flexible armored pipe of claim 1, wherein the restraining regions are in the form of protuberances from said primary surface area.

23. The unbonded flexible armored pipe of claim 1, wherein the restraining regions are in the form of indentations on said primary surface area.

* * * * *